(12) United States Patent
Furbeck

(10) Patent No.: US 10,009,643 B2
(45) Date of Patent: Jun. 26, 2018

(54) APPARATUS AND METHOD FOR PROCESSING MEDIA CONTENT

(71) Applicant: BlackBerry Limited, Waterloo (CA)

(72) Inventor: David Stuart Furbeck, Irving, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days. days.

(21) Appl. No.: 15/126,849

(22) PCT Filed: Mar. 31, 2014

(86) PCT No.: PCT/US2014/032386
§ 371 (c)(1),
(2) Date: Sep. 16, 2016

(87) PCT Pub. No.: WO2015/152877
PCT Pub. Date: Oct. 8, 2015

(65) Prior Publication Data
US 2017/0099513 A1    Apr. 6, 2017

(51) Int. Cl.
*H04N 21/2743* (2011.01)
*H04N 21/84* (2011.01)
(Continued)

(52) U.S. Cl.
CPC ..... *H04N 21/2743* (2013.01); *H04N 21/2187* (2013.01); *H04N 21/4223* (2013.01); *H04N 21/84* (2013.01); *H04N 21/85406* (2013.01)

(58) Field of Classification Search
None
See application file for complete search history.

(56) References Cited

U.S. PATENT DOCUMENTS

| 2009/0009605 A1* | 1/2009 | Ortiz | H04N 5/232 348/157 |
| 2009/0097161 A1* | 4/2009 | Naruse | G11B 5/4846 360/244.1 |

(Continued)

OTHER PUBLICATIONS

International Preliminary Report on Patentability dated Oct. 13, 2016, received for International Application No. PCT/US2014/032386.

*Primary Examiner* — Omar S Parra
(74) *Attorney, Agent, or Firm* — Donna Flores; Fleit Gibbons Gutman Bongini & Bianco P.L.

(57) ABSTRACT

An apparatus and method pertaining to transmitting media content recorded by a media recorder in combination with metadata. That metadata can include information regarding one or more of technical information regarding the media recorder (such as, but not limited to, information that categorically characterizes the media recorder as regards a type of media recorder and/or information regarding technical specifications for the media recorder), orientation information regarding the media recorder when recording the media content (such as, but not limited to, information that corresponds to a field of view when recording the media content), and parameter settings regarding the media recorder when recording the media content (such as, but not limited to, information regarding selectively variable parameters such as zoom settings and digital imaging sensitivity settings).

23 Claims, 7 Drawing Sheets

(51) Int. Cl.
*H04N 21/2187* (2011.01)
*H04N 21/4223* (2011.01)
*H04N 21/854* (2011.01)

(56) References Cited

U.S. PATENT DOCUMENTS

2010/0274816 A1    10/2010   Guzik
2012/0219271 A1*   8/2012   Vunic ................. G06K 9/00711
                                                               386/278
2013/0188922 A1     7/2013   Furbeck et al.
2014/0372570 A1*   12/2014   Gupta ..................... H04L 67/06
                                                               709/219
2016/0155475 A1*   6/2016   Hamer ................. H04N 21/242
                                                               386/224
2017/0180961 A1*   6/2017   Gauglitz ............... H04W 4/206

* cited by examiner

APPARATUS AND METHOD FOR PROCESSING MEDIA CONTENT

FIELD OF TECHNOLOGY

The present disclosure relates to digital media content and in particular to handling media content as sourced by a plurality of media sources.

BACKGROUND

Electronic devices, including portable electronic devices, have gained widespread use and may provide a variety of functions including, for example, telephonic, electronic messaging and other personal information manager application functions. Portable electronic devices include, for example, several types of mobile stations such as simple cellular telephones, smart telephones, wireless personal digital assistants (PDAs), and laptop computers with wireless 802.11 or Bluetooth capabilities.

Many electronic devices comprise, at least in part, a media recorder. Examples include but are not limited to video recorders, audio recorders, and video/audio recorders. Such electronic devices are often configured to facilitate uploading recorded media content to one or more remote locations. Examples of the latter include, but are not limited to, the YouTube service, the Facebook service, and so forth.

Once uploaded, such media content often becomes available to others to consume via, for example, a streaming service. Many services permit the media consumer to search the available media content via titles and/or tags that describe or otherwise characterize the substantive content of the media. Using such facilities, for example, a media consumer can search for videos that capture performances of a particular musical group at a particular venue on a particular day.

While present day practices in these regards are adequate to some extent, the applicant has determined that there exists considerable room for improvement.

DETAILED DESCRIPTION

Figure 1:
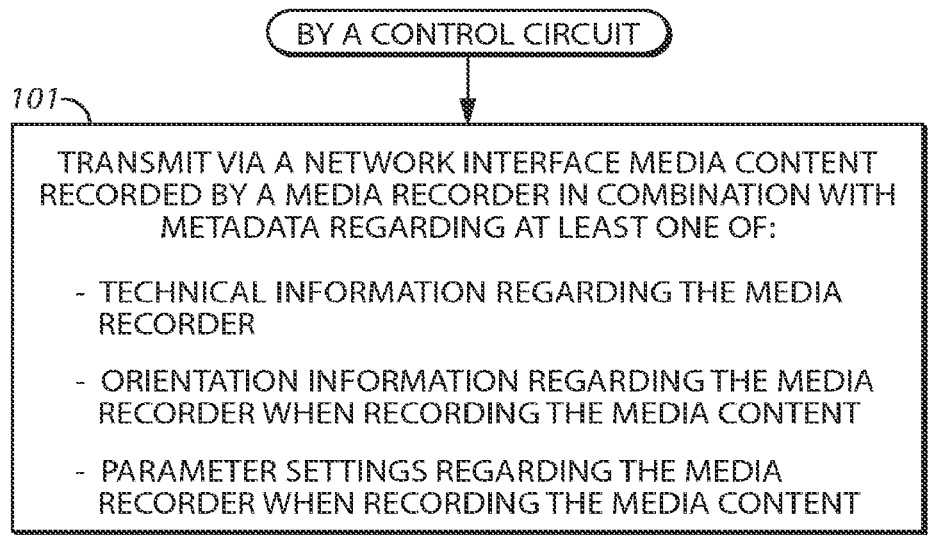
FIG. 1 is a flow diagram in accordance with the disclosure.

The following describes an apparatus and method pertaining to transmitting media content recorded by a media recorder in combination with metadata. That metadata can include information regarding one or more of technical information regarding the media recorder (such as, but not limited to, information that categorically characterizes the media recorder as regards a type of media recorder and/or information regarding technical specifications for the media recorder), orientation information regarding the media recorder when recording the media content (such as, but not limited to, information that corresponds to a field of view when recording the media content), and parameter settings regarding the media recorder when recording the media content (such as, but not limited to, information regarding selectively variable parameters such as zoom settings and digital imaging sensitivity settings).

By one approach, a control circuit can employ the media content and corresponding metadata as corresponds to a shared experience (such as, but not limited to, a temporally-shared experience) to provide an opportunity to a media consumer to select from amongst the media content where that opportunity includes presenting information representative, at least in part, of the corresponding metadata.

These teachings are highly flexible in practice and will accommodate a wide variety of enabling approaches. For example, the aforementioned opportunity can include presenting the indicated information in a Media Presentation Description. As another example, in lieu of the foregoing or in combination therewith, the aforementioned opportunity can include presenting the information in the form of highlights descriptors.

As yet another example in these regards, the opportunity can include using a split screen technique to display at least some of the available items of media content (where the individual images are either a still image or a video). If desired, when the media consumer selects a particular one of the available media content items, that selection may serve as a selection of a particular highlight. In that case, a new split screen may display a plurality of different media content as pertains to that selected highlight.

As another example in these regards, a plurality of views in a split-screen format can be provided when the user selects a particular location, say, within a stadium (such as section 113, say). The split screen display can then present various available media content as uploaded by various media sources located within that general location and the user can then select a particular item of media content that best meets their preferences or requirements. (A similar approach can be employed to present a plurality of audio sources as well if desired.)

So configured, media content can be accompanied and/or tagged in any of a variety of ways with metadata not previously typically provided in these regards. That metadata, in turn, can help a media consumer to identify which items of media content for a particular event or the like that best suits the consuming requirements and/or preferences of the media consumer. That metadata can also facilitate a third party content provider picking and choosing from amongst a variety of media content in the same regards to thereby offer an edited and/or otherwise aggregated combination of media content that provides a better consuming experience than any of the individual items of media content.

These and many other benefits may become more clear upon making a thorough review and study of the following detailed description. For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

FIG. 1 presents a process 100 that can be carried out, for example, by a control circuit. By one approach, and referring momentarily to FIG. 2, this control circuit 201 can comprise a part of a media source 200. Generally speaking, this media source 200 can comprise any of a variety of enabling platforms such as, but not limited to, so-called smart phones, pad/tablet-styled devices, and video and audio recorders.

Such a control circuit 201 can comprise a fixed-purpose hard-wired platform or can comprise a partially or wholly programmable platform. These architectural options are well known and understood in the art and require no further description here. This control circuit 201 is configured (for example, by using corresponding programming as will be well understood by those skilled in the art) to carry out one or more of the steps, actions, and/or functions described herein.

Optionally, the control circuit 201 operably couples to a memory 202. The memory 202 may be integral to the control circuit 201 or can be physically discrete (in whole or in part) from the control circuit 201 as desired. This memory 202 can also be local with respect to the control circuit 201 (where, for example, both share a common circuit board, chassis, power supply, and/or housing) or can be partially or wholly remote with respect to the control circuit 201. This memory 202 can serve, for example, to non-transitorily store the computer instructions that, when executed by the control circuit 201, cause the control circuit 201 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

In this illustrative example the control circuit 201 also operably couples to a network interface 203 and one or more media recorder's 204. The network interface 203 can comprise any of a variety of wireless or non-wireless interfaces as are known in the art. The media recorder 204, in turn, can comprise any of a variety of image and/or audio capture devices that record a digital version of the captured image/audio. Such media recorders are well known in the art and therefore, for the sake of brevity, further elaboration in these regards is not provided here except where relevant further herein.

Figure 2:
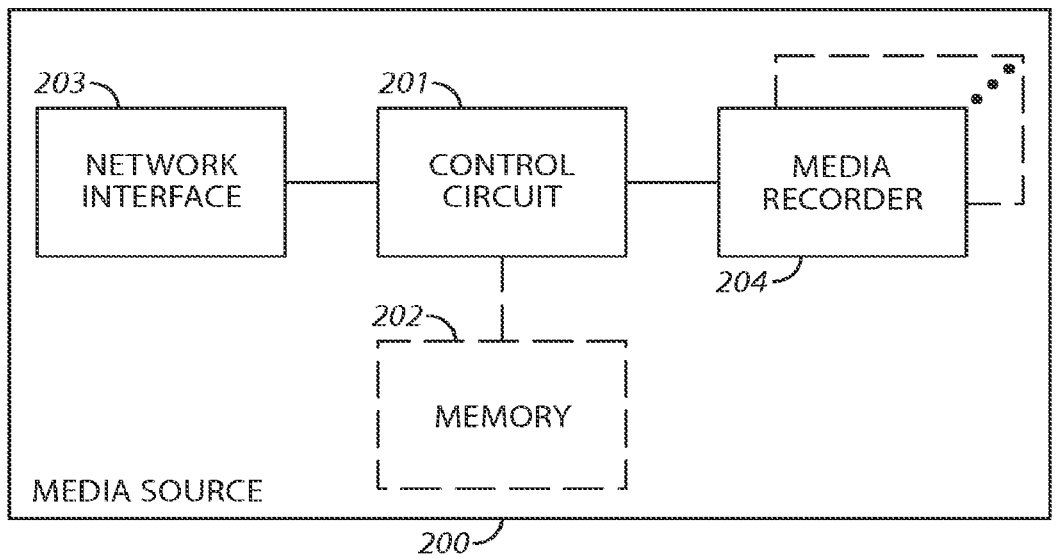
FIG. 2 is a block diagram in accordance with the disclosure.

With continued reference to FIGS. 1 and 2, at block 101 the control circuit 201 transmits, via the aforementioned network interface 203, media content as recorded by the media recorder 204. These teachings will accommodate transmitting that media content to any of a variety of destinations including both private and public recipients, social networking services, cloud storage services, and so forth.

This process 100 also provides for transmitting metadata in combination with the aforementioned media recorder. There are various ways by which a transmission of media content can include accompanying metadata. See, for example, PCT patent application international publication number WO 2013/112379 A1 entitled MULTIMEDIA FILE SUPPORT FOR MEDIA CAPTURE DEVICE POSITION AND LOCATION TIMED METADATA which teaches a method of recording one or more of position and other parameters into a timed metadata track in the 3GPP File Format or other file formats that are based on the ISO Base Media File Format. The present process 100, however, will accommodate transmitting metadata not ordinarily contemplated.

By one approach, for example, the metadata includes technical information regarding the media recorder 204. Examples in these regards include but are not limited to information that categorically characterizes the media recorder 204 as regards a type of media recorder (for example, by brand and model and/or by reference to whether the media recorder 204 is a video-only recorder, and audio-only recorder, a video/audio recorder, and so forth) and/or information regarding technical specifications for the media recorder (for example, particular image capture, compression, and presentation specifications, optical and digital zoom capabilities, and so forth).

By another approach, in lieu of the foregoing or in combination therewith, the metadata includes orientation information regarding the media recorder 204 when recording the media content such as information that corresponds to a field of view. Such information can be represented, for example, as a compass direction and/or an angle of vertical inclination as desired.

By yet another approach, and again in lieu of the foregoing or in combination therewith, the metadata includes information regarding at least one selectively variable parameter for the media recorder 204. Examples in these regards include, but are not limited to, identifying a particular audio source (such as use of an internal microphone or use of an external and/or remote microphone), a particular zoom setting, and/or a digital imaging sensitivity setting (akin, for example, to an ISO film speed setting for a traditional film camera).

Figure 3:
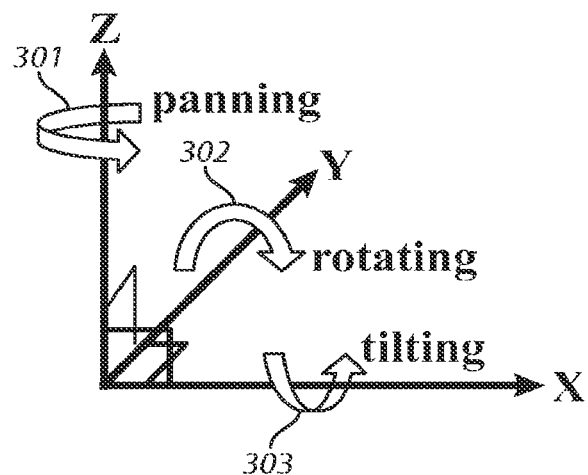
FIG. 3 is orientation framework in accordance with the disclosure.

The selectively variable parameter can have a static value for the duration of the corresponding media content, or may, if desired, dynamically change during the recording. In such a case, the metadata can also represent those dynamic changes to the particular selectively variable parameter while recording the media content. As one example, the metadata can indicate and specify changes to a zoom setting when capturing video media content. As another example in these regards, and referring momentarily to FIG. 3, the metadata can represent dynamic changes made with respect to panning 301, rotating 302, and/or tilting 303 of the media recorder 204 while recording the media content.

The present teachings are highly flexible as regards the foregoing and will readily accommodate, for example, transmitting any one, two, or all of the metadata types described above in conjunction with the transmission of a particular item of media content.

Figure 4:
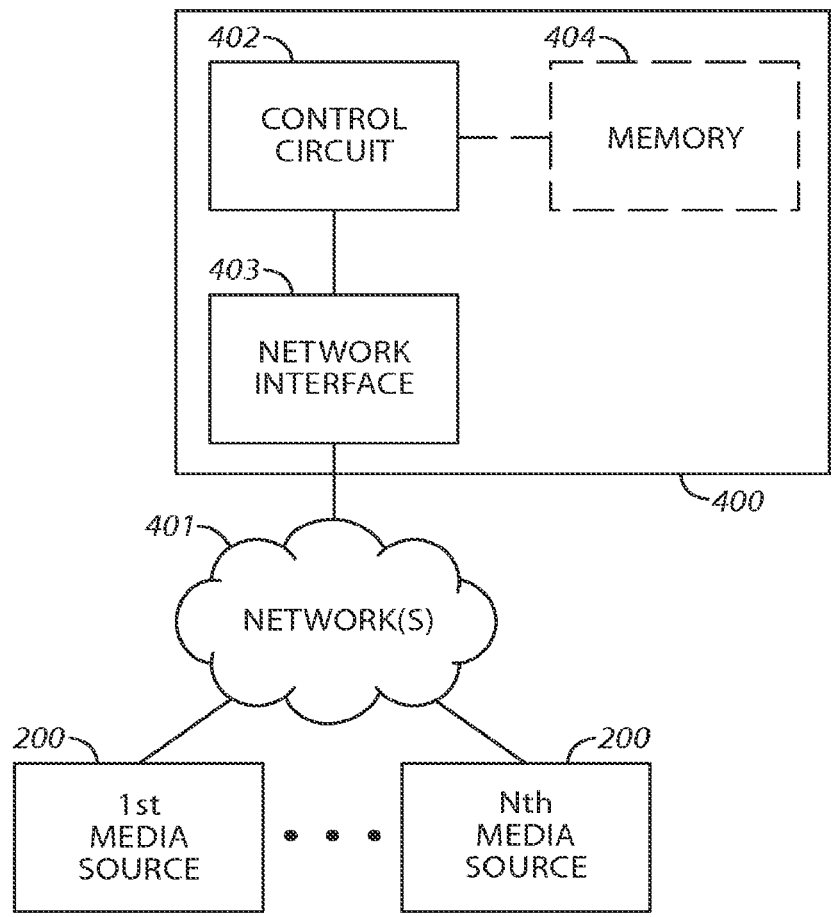
FIG. 4 is a block diagram in accordance with the disclosure.

Referring to FIG. 4, such transmissions by a media source 200 are provided to a destination platform 400 via one or more intervening wireless and/or non-wireless networks 401 in accordance with well understood prior art technique. The destination platform 400 can generally include a control circuit 402 that operably couples to the network(s) 401 via a network interface 403. The control circuit 402 can also optionally couple to a memory 404 if desired. Such components can be architecturally similar to the similarly-named components described above. The destination platform 400 itself can comprise any of a variety of network elements including, but not limited to, mobile devices, servers, and so forth.

Figure 5:
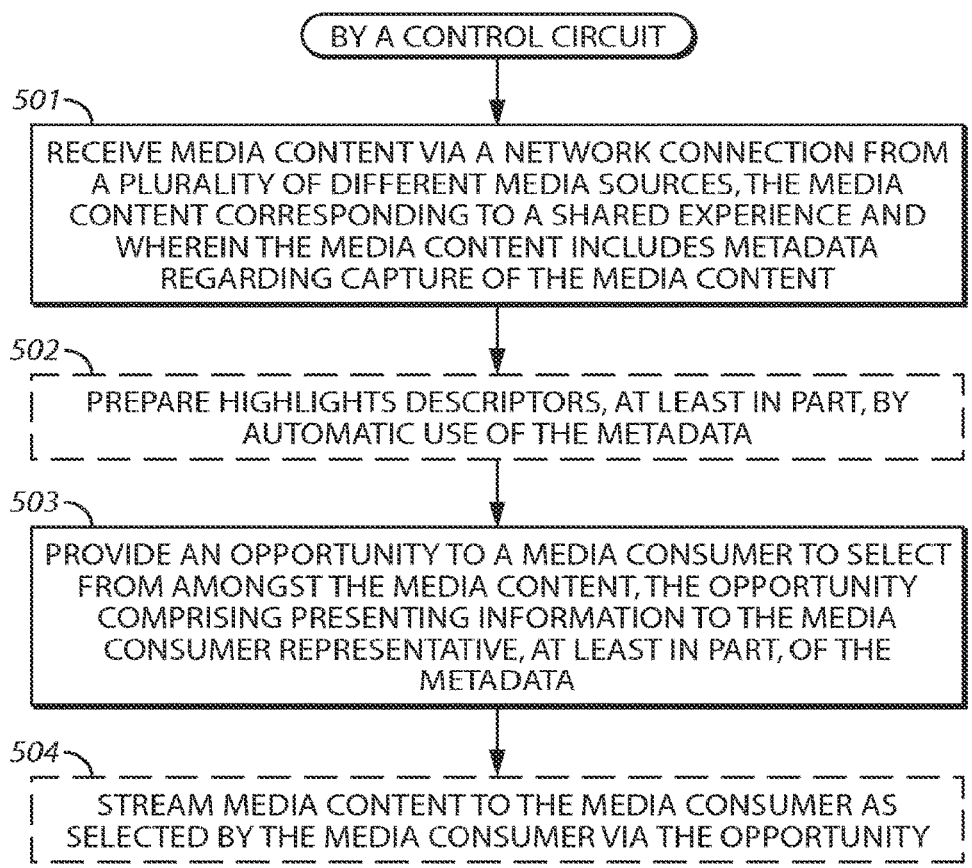
FIG. 5 is a flow diagram in accordance with the disclosure.

So configured, and referring now as well to FIG. 5, at block 501 the destination platform 400 can receive media content and the aforementioned metadata from a plurality of media sources 200 (represented here by a first through an Nth media source where "N" refers to a non-zero integer greater than 1). These various media sources 200 may be institutionally related (where, for example, all of the media sources 200 are under the control of a common enterprise such as a television network) or these media sources 200 may be institutionally foreign to one another (where, for example, the media sources 200 are each under the control of individuals who are acting on their own private behalf).

By one approach, this plurality of media sources 200 provides media content corresponding to a shared experience such as a temporally-shared experience such as a sporting event, a musical concert, and so forth. For example, these media sources 200 may represent smart phone video/audio recorders being used by various persons in the audience at a soccer match. (As used herein, the expression "temporally-shared experience" does not necessarily require that the window of time represented by each item of media content is exactly the same window of time as is represented by other items of media content provided by other media recorders. Instead, the notion of being temporally shared can refer, for example, to an event having a limited, understood duration such as the time frame that encompasses and temporally encapsulates a sporting event or a musical presentation.)

By one approach, this process 500 will optionally accommodate the control circuit 402 preparing highlights descriptors, at least in part, by automatic use of the foregoing metadata. As one simple illustrative example in these regards, at a particular time during a sporting event it can be known that a particular player performs a particularly useful and compelling action. The aforementioned metadata can be utilized, for example, to determine which of the items of media content are likely inclusive of that particular action. Those particular items of media content can then be tagged or otherwise marked or identified as being associated with a highlight that corresponds to that particular action.

These teachings are very flexible in these regards and will accommodate a wide variety of ways by which the aforementioned metadata can be leveraged to facilitate parsing the aggregated media content from these various media sources 200 into media content that is more readily and conveniently accessed and mind by media consumers. Some further examples in these regards are provided further herein.

Figure 6:
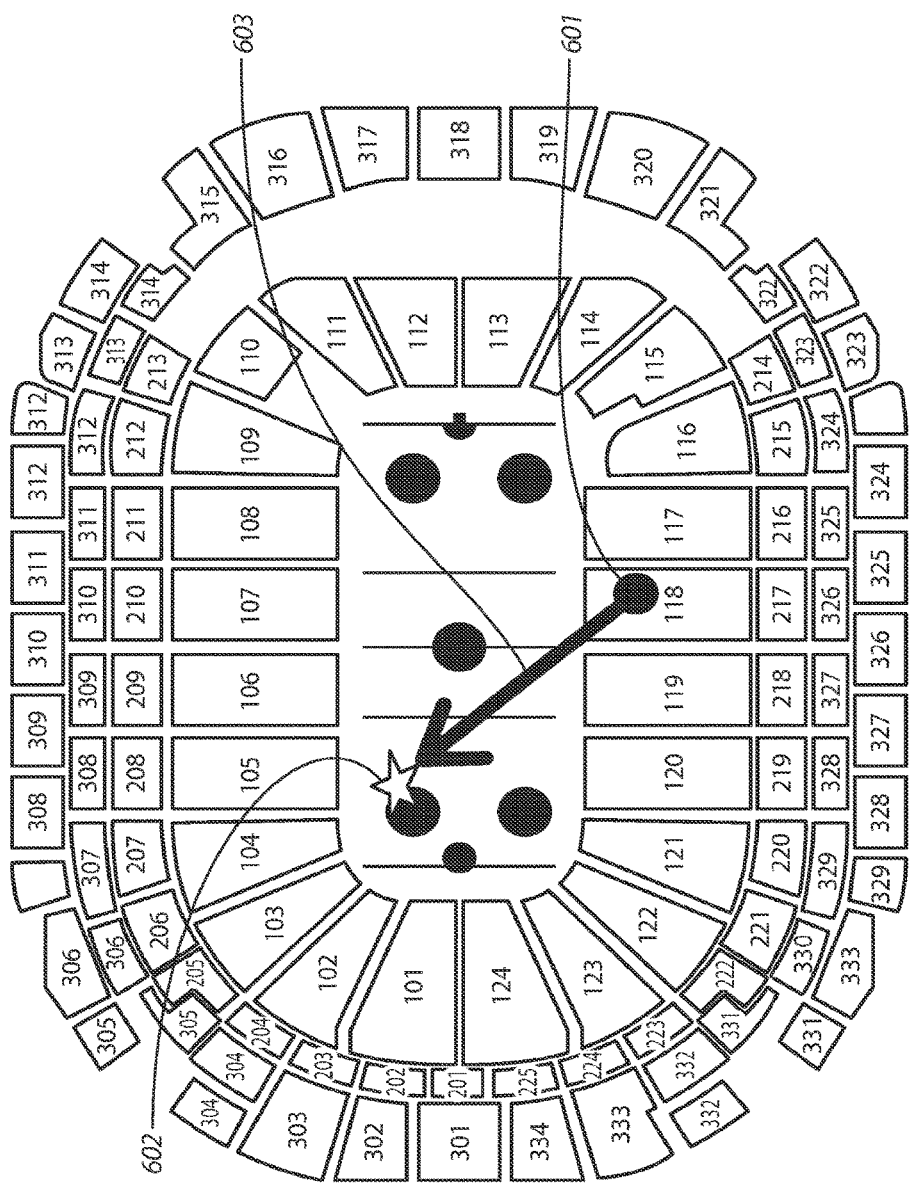
FIG. 6 is a screenshot in accordance with the disclosure.

At block 503, this process 500 provides an opportunity to a media consumer to select from amongst the aforementioned media content. This opportunity can include presenting information representative, at least in part, of the aforementioned metadata. As one simple illustrative example in these regards, FIG. 6 depicts an overhead view of a stadium 600 and identifies a particular location 602 on the field at a particular time where a particular action of interest occur. This same depiction also indicates the location 601 of a particular media recorder 601 and the field of view 603 of that media recorder 601 to help the media consumer identify that the media content from that particular media recorder 601 at that particular time will likely include imagery of interest as regards this particular action. Other media sources and their respective fields of view can be similarly presented but are omitted here for the sake of clarity.

As a related approach, in lieu of the foregoing or in combination therewith, upon selecting a particular location within the stadium 600, the media consumer may then be presented with an opportunity comprising a plurality of images (still images or videos) as correspond to different items of media content that correlate to the selected location. The media consumer can then select a particular item of media content by selecting one of the plurality of images.

By one approach, if desired, in lieu of the foregoing or in combination therewith, such an opportunity can include presenting the relevant information regarding the metadata in a Media Presentation Description (the latter being a known construct and presentation vehicle having metadata that lets the client know among other things where the content of the presentation is and in what formats; in MPEG DASH and 3GP-DASH the Media Presentation Description comprises an XML file).

Figure 7:
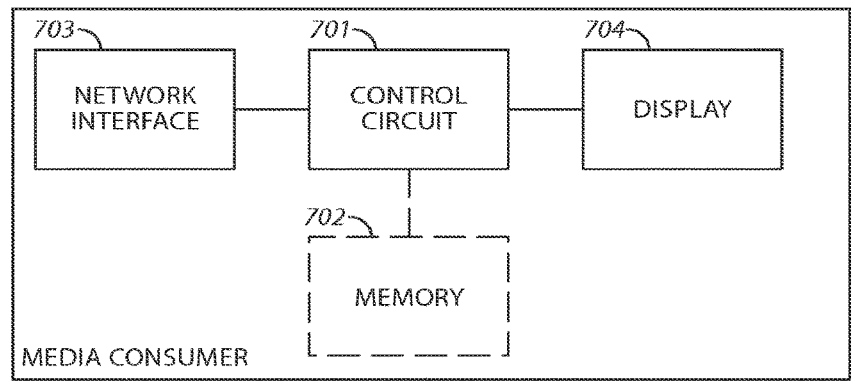
FIG. 7 is a block diagram in accordance with the disclosure.

At block 504 this process 500 can then optionally provide for streaming media content to a media consumer as selected by the media consumer via the opportunity. FIG. 7 presents an illustrative media consumer platform 700. In this illustrative example the media consumer platform 700 includes a control circuit 701 that can again optionally couple, if desired, to a corresponding memory 702 and also to a network interface 703 and a display 704. The control circuit 701, memory 702, and network interface 703 can be architecturally similar to those same-named components described above.

The display 704 can comprise any of a variety of known displays and can serve to present to a user the aforementioned opportunity to select from amongst a variety of media content, which opportunity can include presenting information representative, at least in part, of the aforementioned metadata. As explained above, by one approach this opportunity can comprise presenting such information on the display 704 in the form of highlights descriptors.

Figure 8:
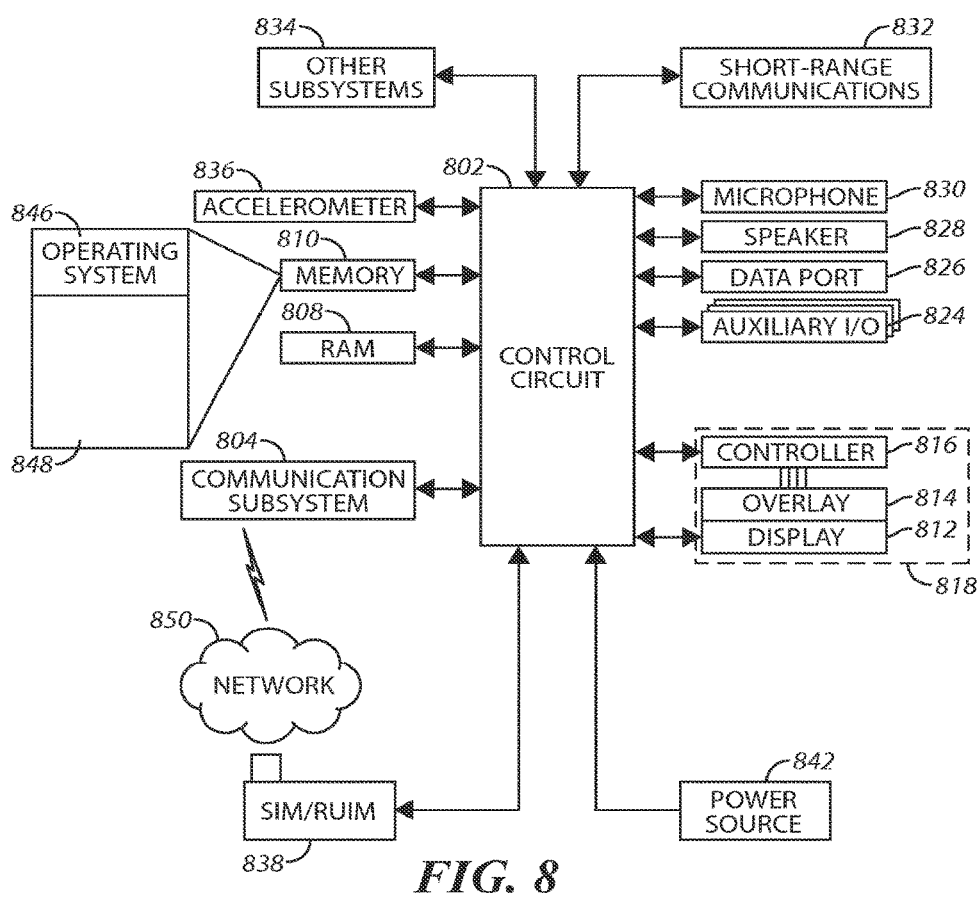
FIG. 8 is a block diagram in accordance with the disclosure.

A portable electronic device can serve, if desired, and as any of the above-described platforms. FIG. 8 presents an exemplary portable electronic device having a control circuit 802 that controls the overall operation of the portable electronic device. In this particular illustrative example the portable electronic device comprises a portable communications device. Corresponding communication functions, including data and voice communications, are performed through a communication subsystem 804. The communication subsystem receives messages from and sends messages to a wireless network 850.

The wireless network 850 may be any type of wireless network, including, but not limited to, a wireless data networks, a wireless voice network, or a network that supports both voice and data communications. The control circuit 802 may also operably couple to a short-range communication subsystem 832 (such as an 802.11 or 802.16-compatible transceiver and/or a Bluetooth™-compatible transceiver). To identify a subscriber for network access, the portable electronic device may utilize a Subscriber Identity Module or a Removable User Identity Module (SIM/RUIM) card 838 for communication with a network, such as the wireless network 850. Alternatively, user identification information may be programmed into a memory 810.

A power source 842, such as one or more rechargeable batteries or a port to an external power supply, powers the electronic device. The control circuit 802 may interact with an accelerometer 836 that may be utilized to detect direction of gravitational forces or gravity-induced reaction forces. The control circuit 802 also interacts with a variety of other components, such as a Random Access Memory (RAM) 808, a memory 810, an auxiliary input/output (I/O) subsystem 824, a data port 826, a speaker 828, a microphone 830, and other device subsystems 834 of choice.

A display 812 can be disposed in conjunction with a touch-sensitive overlay 814 that operably couples to an electronic controller 816. Together these components can comprise a touch-sensitive display 818 that serves as a graphical-user interface. Information, such as text, characters, symbols, images, icons, and other items may be displayed on the touch-sensitive display 818 via the control circuit 802.

The touch-sensitive display 818 may employ any of a variety of corresponding technologies including but not limited to capacitive, resistive, infrared, surface acoustic wave (SAW), strain gauge, optical imaging, dispersive signal technology, and/or acoustic pulse recognition-based touch-sensing approaches as are known in the art. If the touch-sensitive display 818 should utilize a capacitive approach, for example, the touch-sensitive overlay 814 can comprise a capacitive touch-sensitive overlay 814. In such a case the overlay 814 may be an assembly of multiple stacked layers including, for example, a substrate, a ground shield layer, a barrier layer, one or more capacitive touch sensor layers separated by a substrate or other barrier, and a cover. The capacitive touch sensor layers may comprise any suitable material, such as indium tin oxide (ITO).

The portable electronic device includes an operating system 846 and software programs, applications, or components 848 that are executed by the control circuit 802 and are typically stored in a persistent, updatable store such as the memory 810. Additional applications or programs may be loaded onto the portable electronic device through the wireless network 850, the auxiliary I/O subsystem 824, the data port 826, the short-range communications subsystem 832, or any other suitable subsystem 834. The memory 810 may comprise a non-transitory storage media that stores executable instructions which, when executed, causes one or more of the functions, steps, or actions described herein.

As a communication device, a received signal such as a text message, an e-mail message, or web page download is processed by the communication subsystem and input to the control circuit 802. The control circuit 802 processes the received signal for output to the display 812 and/or to the auxiliary I/O subsystem 824. A user may generate data items, for example e-mail messages, that may be transmitted over the wireless network 850 through the communication subsystem. For voice communications, the overall operation of the portable electronic device is similar. The speaker 828 outputs audible information converted from electrical signals, and the microphone 830 converts audible information into electrical signals for processing.

The teachings provided herein are applicable in any situation where multiple recordings (be they audio recordings, video recording, or both) are being made concurrently or at least within a similar timeframe as regards a particular event. The recordings may be by devices that are generally co-located (for example, at a single venue such as a sports stadium or arena or a concert venue) or may be geographically dispersed. For example, celebrations of a common event such as New Year's or geographically dispersed views of the night sky, for example, could be recorded on handheld devices and uploaded to a server.

Some further details regarding the provision of such metadata and the first instance will now be provided. It will be understood that these details are not intended to suggest any limitations with respect to the scope of these teachings.

The 3GPP File Format is based on the ISO/IEC 14496-12 ISO Base Media File Format. The file structure is object oriented. As with object oriented programming languages, all objects are instances of a blueprint in the form of a class definition. Files consist of a series of objects called boxes and the structure of a box can be inferred from its type. Boxes can contain media data or metadata and may contain other boxes. Each box begins with a header that contains its total size in bytes (including any other boxes contained within it) and an associated box type (typically a four-character name).

The class definitions are given in the syntax description language (SDL). The definition of the abstract class "Box" appears as follows:

```
aligned(8) class Box (unsigned int(32) boxtype,
optional unsigned int(8)[16] extended_type) {
unsigned int(32) size;
unsigned int(32) type = boxtype;
if (size==1) {
unsigned int(64) largesize;
} else if (size==0) {
// box extends to end of file
}
if (boxtype=='uuid') {
unsigned int(8)[16] usertype = extended_type;
}
}
```

All other classes can be derived from "Box" using the concept of inheritance found in object oriented programming.

The "movie box" or "moov" box contains all of the static metadata for a presentation and media data is contained in the "media data box" or "mdat" box. Within the "moov" box, a file may contain "tracks" with metadata for different types of media. For example, track 1 may contain metadata for a video encoding and track 2 may contain metadata for an audio encoding. Within each track is a "media box" (not to be confused with "media data box") that contains, among other things, the timescale and duration of the track. Also contained within the media box is the "sample table box." A sample is all of the media data associated with one time stamp for a particular track. So, for example, a sample described by a video track might be one frame. A sample described by an audio track might be 10 speech codec frames, and so forth. The sample table box contains codec information. Some of the box types and box hierarchy in the ISO Base Media File Format are shown below in table 1.

TABLE 1

| | | | | |
|---|---|---|---|---|
| ftyp | | | | File type and compatibility |
| moov | | | | Container for all static meta data |
| | mvhd | | | Movie header, overall declarations |
| | trak | | | Container for an individual track or stream |
| | | tkhd | | Track header, overall information in a track |
| | | tref | | Track reference container |
| | | mdia | | Container for media information in a track |
| | | | mdhd | Media header, overall information about the media |

TABLE 1-continued

|   |   |   |   |   | |
|---|---|---|---|---|---|
|   | hdlr |   |   |   | Handler, declares the media type |
|   | minf |   |   |   | Media information container |
|   |   | vmhd |   |   | Video media header, overall information for video track only |
|   |   | smhd |   |   | Sound media header, overall information for sound track only |
|   |   | stbl |   |   | Sample table box, container for the time/space map |
|   |   |   | stsd |   | Sample descriptions for the initialization of the media decoder |
|   |   |   | stts |   | Decoding time-to-sample |
|   |   |   | ctts |   | Composition time-to-sample |
|   |   |   | stsc |   | Sample-to-chunk |
|   |   |   | stsz |   | Sample sizes |
|   |   |   | stco |   | Chunk offset to beginning of the file |
|   |   |   | stss |   | sync sample table for Random Access Points |
| moof |   |   |   |   | Movie fragment |
|   | mfhd |   |   |   | Movie fragment header |
|   | traf |   |   |   | Track fragment |
|   |   | tfhd |   |   | Track fragment header |
|   |   | trun |   |   | Track fragment run |
| mfra |   |   |   |   | Movie fragment random access |
|   | tfra |   |   |   | Track fragment random access |
|   | mfro |   |   |   | Movie fragment random access offset |
| mdat |   |   |   |   | Media data container |

Figure 9:
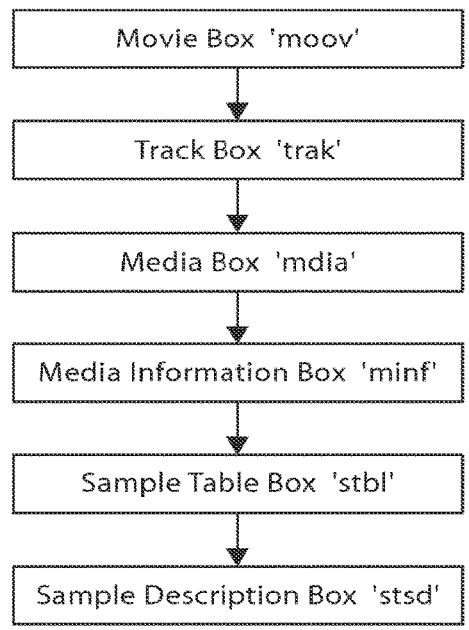
FIG. 9 is a schematic representation in accordance with the disclosure.

FIG. 9 presents a hierarchical view of some of these boxes.

When the media data exists prior to the creation of the "moov" box, then the sample table box typically contains all of the timing and sample location information necessary to render the presentation.

In live streaming use cases, however, it is not possible to write all of the metadata in advance about the whole media stream because such information is not yet known. Also, if there is less overhead at the beginning of the file, startup times can be quicker. For this reason the ISO base media file format (and hence the 3GPP File Format through inheritance) allows the boxes to be organized as a series of metadata/media data box pairs ("moof"/"mdat" box pairs) called "movie fragments."

The use of fragmented files enables the encoder to write and the client to download media a portion at a time, while minimizing startup delay by including metadata in the "moof" boxes of the media fragments as opposed to up front in the "moov" box. Being able to download a portion of media at a time due to the fragmented structure is also what enables DASH and 3GP-DASH clients to adapt by switching to different encodings during a presentation.

The "moov" box still contains a "sample table box", which itself contains a "sample description box" that describes the codecs used for encoding, but the "moov" box does not contain any specific information about the media samples such as timing, offsets, and so forth "moof" boxes are only allowed to contain references to the codecs listed in the "moov" box. Therefore, if a new codec needs to be used that has not been defined in the "moov" box, a new "moov" box needs to be created. A new "moov" box must be in a different file as it is not valid to have two "moov" boxes within the ISO based media file format and those file formats derived from it.

Inside the media box noted above is a "handler reference box", whose main purpose is to indicate a "handler_type" for the media data in the track. The currently supported handler_types are 'vide' for a video track, 'soun' for an audio track, 'hint' for a hint track (which provides instructions on packet formation to streaming servers), and 'meta' for a timed metadata track.

The SDL code for the sample description box is as follows:

```
aligned(8) class SampleDescriptionBox (unsigned int(32)
handler_type)
    extends FullBox('stsd', 0, 0){
    int i ;
    unsigned int(32) entry_count;
        for (i = 1 ; i <=
        entry_count ; i++){
        switch
        (handler_type){
            case 'soun': // for audio tracks
                AudioSampleEntry( );
                break;
            case 'vide': // for video tracks
                VisualSampleEntry( );
                break;
            case 'hint': // Hint track
                HintSampleEntry( );
                break;
            case 'meta': // Metadata track
                MetadataSampleEntry( );
                break;      }
        }
    }
}
```

Audio SampleEntry, VisualSampleEntry, HintSampleEntry, and MetadataSampleEntry are abstract classes that extend the abstract class SampleEntry. The SDL code for these are as follows:

```
aligned(8) abstract class SampleEntry (unsigned int(32)
format)
    extends Box(format){
    const unsigned int(8)[6] reserved = 0;
    unsigned int(16) data_reference_index;
}
    // Audio Sequences
class AudioSampleEntry(codingname) extends SampleEntry
(codingname){
    const unsigned int(32)[2] reserved = 0;
    template unsigned int(16) channelcount = 2;
    template unsigned int(16) samplesize = 16;
    unsigned int(16) pre_defined = 0;
    const unsigned int(16) reserved = 0 ;
```

-continued

```
      template unsigned int(32) samplerate = { default samplerate
         of media}<<16;
   }
      // Video Sequences
   class VisualSampleEntry(codingname) extends SampleEntry
   (codingname){
      unsigned int(16) pre_defined = 0;
      const unsigned int(16) reserved = 0;
      unsigned int(32)[3] pre_defined = 0;
      unsigned int(16) width;
      unsigned int(16) height;
      template unsigned int(32)    horizresolution = 0x00480000; //
      72 dpi
      template unsigned int(32)             vertresolution =
      0x00480000; // 72 dpi
      const unsigned int(32)       reserved = 0;
      template unsigned int(16)    frame_count = 1;
      string[32] compressorname;
      template unsigned int(16)    depth = 0x0018;
      int(16)pre_defined = -1;
      CleanApertureBox clap; // optional
      PixelAspectRatioBox   pasp;  // optional
   }
   class HintSampleEntry( ) extends SampleEntry (protocol) {
      unsigned int(8) data [ ];
   }
   class MetaDataSampleEntry(codingname) extends SampleEntry
   (codingname) {
   }
```

Any particular codec would extend these classes. For example, 3GPP TS 26.244 defines AMRSampleEntry, H263SampleEntry, AVCSampleEntry, and so forth. The only currently defined classes that extend MetaDataSampleEntry are as follows:

```
   class XMLMetaDataSampleEntry( ) extends MetaDataSampleEntry
   ('metx') {
      string content_encoding; // optional
      string namespace;
      string schema_location; // optional
      BitRateBox ( ); // optional
   }
   class TextMetaDataSampleEntry( ) extends MetaDataSampleEntry
   ('mett') {
      string content_encoding; // optional
      string mime_format;
      BitRateBox ( ); // optional
   }
```

Device location can be described in terms of latitude, longitude, and altitude as is done in the location information box in 3GPP TS 26.244 as exemplified below in Table 2.

TABLE 2

| Field | Type | Details | Value |
| --- | --- | --- | --- |
| BoxHeader.Size | Unsigned int(32) | | |
| BoxHeader.Type | Unsigned int(32) | | 'loci' |
| BoxHeader.Version | Unsigned int(8) | | 0 |
| BoxHeader.Flags | Bit(24) | | 0 |
| Pad | Bit(1) | | 0 |
| Language | Unsigned int(5)[3] | Packed ISO-639-2/T language code | |
| Name | String | Text of place name | |
| Role | Unsigned int(8) | Non-negative value indicating role of location | |
| Longitude | Unsigned int(32) | Fixed-point value of the longitude | |
| Latitude | Unsigned int(32) | Fixed-point value of the latitude | |

TABLE 2-continued

| Field | Type | Details | Value |
| --- | --- | --- | --- |
| Altitude | Unsigned int(32) | Fixed-point value of the Altitude | |
| Astronomical_body | String | Text of astronomical body | |
| Additional_notes | String | Text of additional location-related information | |

In the foregoing example, Longitude, Latitude, and Altitude have the following semantics:

Longitude: fixed-point 16.16 number indicating the longitude in degrees. Negative values represent western longitude.

Latitude: fixed-point 16.16 number indicating the latitude in degrees. Negative values represent southern latitude.

Altitude: fixed-point 16.16 number indicating the altitude in meters. The reference altitude, indicated by zero, is set to the sea level.

In addition to location, the device orientation can be described according to the direction the camera is facing and how it is tilted and rotated. The parameters Pan, Rotation, and Tilt can be defined to describe device orientation just as Longitude, Latitude, and Altitude describe the device's position. In addition to the above parameters, a parameter defining the amount of optical or digital zoom can also be useful as a person farther away with more zoom might have a preferable view to another person who is closer to the event with less zoom.

One of the applications that makes use of the ISO Base Media File Format/3GPP File Format is 3GPP Dynamic and Adaptive Streaming over HTTP (3GPP-DASH) and MPEG DASH. The Segments in MPEG DASH comprise boxes described in the ISO Base Media File Format, including one or more "movie fragments" as defined there.

Figure 10:
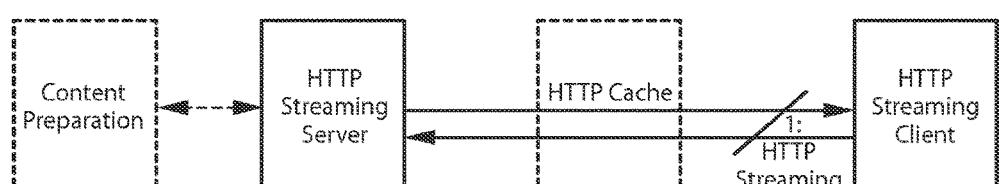
FIG. 10 is a schematic representation in accordance with the disclosure.

An HTTP Streaming client uses HTTP GET requests to download a media presentation. As noted above, the presentation is described in an XML document called a Media Presentation Description (MPD). From the MPD the client can learn in what formats the media content is encoded (e.g. bitrates, codecs, resolutions, languages). The client then chooses a format based possibly on, for example, characteristics or preferences of the client such as desired screen resolution, channel bandwidth of the client, channel reception conditions, or information configured in the client by the user, e.g. language preference, etc. and downloads the corresponding media data. FIG. 10 presents the system architecture 1000 as corresponds to such an approach.

Figure 11:
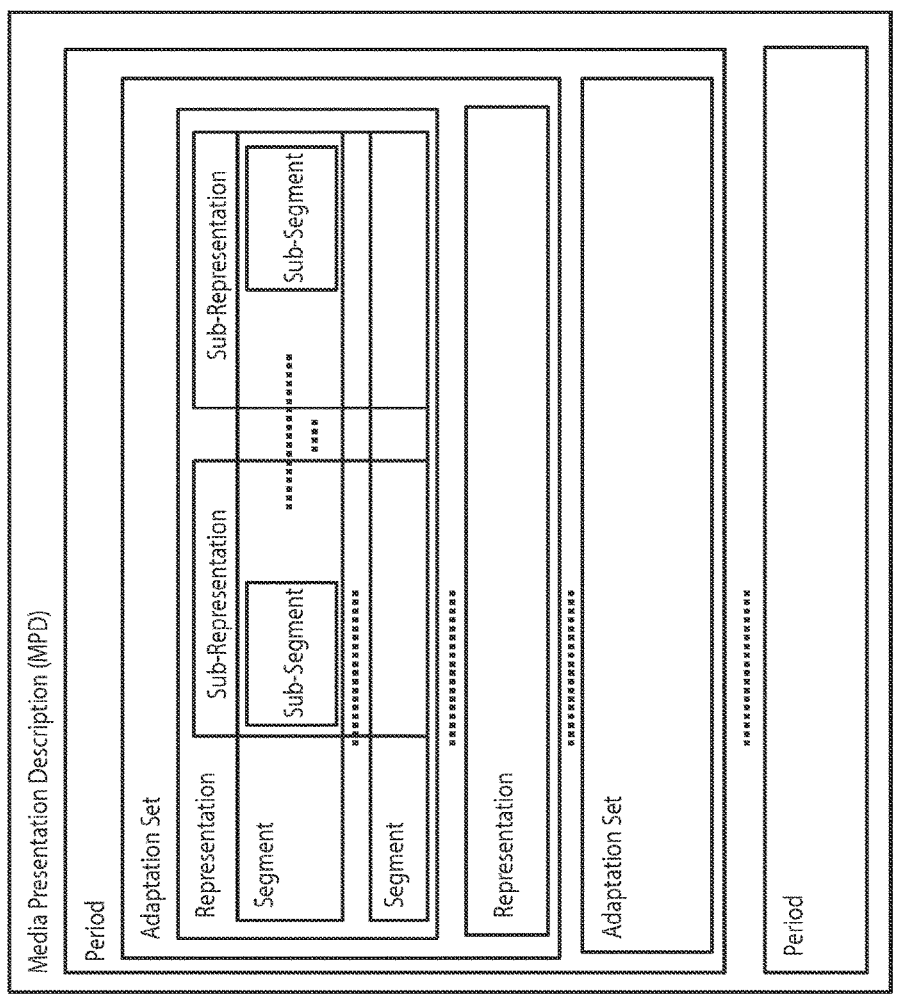
FIG. 11 is a schematic representation in accordance with the disclosure.

By one approach, a Media Presentation can be viewed as consisting of one or more Periods. The Periods are sequential and non-overlapping, i.e. each Period extends until the start of the next Period. Each Period consists of one or more Representations. A Representation is one of the alternative choices of the encoded media content or a subset thereof, typically differing by bitrate, resolution, language, codec, and the like. Each Representation consists of one or more Segments. Segments are the downloadable portions of media and/or metadata that are uniquely addressable via URL and possibly byte range information given in the MPD. Each Representation will contain an Initialization Segment, which contains a 'moov' box as described above. The 'moov' box will contain codec information, but will not contain any sample timing and location information. This will be contained in the non-initialization Segments or "media Segments". The media Segments include one or more "movie fragments". FIG. 11 presents a high level data model 1100 as corresponds to the foregoing.

MPD Deltas, as described in 3GPP TS 26.247, are text files that contain all of the information required for an update of the MPD. In other words, by applying a Delta to an existing MPD, a device can acquire the most up to date version. MPD Deltas can also be created as XML files by using XML Patch Operations.

A Descriptor in DASH and 3GP-DASH contains a "schemeIDUri" attribute that identifies the "scheme" of the Descriptor. The Descriptor also contains an optional "value" attribute and "id" attribute as shown in Table 3 below.

TABLE 3

| a) Element or Attribute Name | b) Use | c) Description |
| --- | --- | --- |
| Element of type DescriptorType | | This element provides information about the use of description. |
| @schemeIdUri | M | Provides a URI to identify the scheme. The definition of this element is specific to the scheme employed for content description. The URI may be a URN or a URL. The @schemeIdUri may be a URN or URL. When a URL is used, it should also contain a month-date in the form mmyyyy; the assignment of the URL must have been authorized by the owner of the domain name in that URL on or very close to that date, to avoid problems when domain names change ownership |
| @value | O | This attribute provides the value for the descriptor element. The value space and semantics must be defined by the owners of the scheme identified in the @schemeIdUri attribute. |
| @id | O | specifies an identifier for the descriptor. Descriptors with identical values for this attribute shall be synonymous, i.e. the processing of one of the descriptors with an identical value is sufficient. |

Legend:
For attributes: M = Mandatory, O = Optional, OD = Optional with Default Value, CM = Conditionally Mandatory.
For elements: <minOccurs> . . . <maxOccurs> (N = unbounded)
Elements are bold; attributes are non-bold and preceded with an @.

The XML-Syntax is as follows:

```
<!-- Generic named descriptive information -->
<xs:complexType name="DescriptorType">
    <xs:sequence>
        <xs:any namespace="##other" processContents="lax"
minOccurs="0" maxOccurs="unbounded"/>
    </xs:sequence>
    <xs:attribute name="schemeIdUri" type="xs:anyURI"
use="required"/>
    <xs:attribute name="value" type="xs:string"/>
    <xs:attribute name="id" type="xs:string"/>
    <xs:anyAttribute namespace="##other" processContents="lax"/>
</xs:complexType>
```

The value space and the semantics of the value attribute are defined by the owners of the scheme defined in the "schemeIdUri" attribute.

As noted above, these teachings will permit uploading and serving content from multiple spectators. By one approach the media content and the MPD metadata can be uploaded from various ones of the spectators to an HTTP server. For example, spectator clients could use the HTTP Post method to upload media Segments to the server. The media can also be transferred by other means such as RTP. If the event is not offered live to HTTP streaming clients, then any of the well-known means for transferring files to the server may be used (for example FTP).

By one approach, the media content from each source (that is, each spectator's device) maps to (i.e. is described by) a separate MPD on the server. Accordingly, each user uploads media Segments and the corresponding MPD(s) to the HTTP streaming server. The MPD can be uploaded using MPD Deltas, for example, when live content is being offered. In this case, an uploading client does not need to upload an entire new version of the MPD every time a new media Segment is uploaded, but can instead upload MPD Deltas. Whatever the format of the delta, when the MPD needs to be updated multiple times, using MPD Deltas is a bandwidth-efficient way to update the MPD on the server.

Consistent with this approach a streaming client may then download an MPD corresponding to the desired recorded content, for example, by going to a web page and selecting available content to download based on a seating chart of the event or some other type of location map of the event. MPD Deltas can also be used when downloading live content. In one embodiment, the HTTP Streaming client downloads and uses the same MPD Deltas that were uploaded by the spectator to the HTTP Streaming server.

An uploading user can tag an MPD or Periods, Adaptation Sets, and Segments in the MPD with "highlights" (key or important points of the event) if they were captured during the recording. For example, this could be accomplished using the Highlight Descriptor described above. Alternatively the server tags in the MPD, Periods, Adaptation Sets, and/or Segments. If the uploading user records timed position and orientation metadata and records it (e.g. in the 3GPP File Format as referenced above), the server or content preparer, by determining the time and location of the highlight, can calculate according to the device position and orientation recorded in the metadata track of the uploading device at the time of the highlight whether or not the uploading user captured the highlight. By another approach, a server might create a customized MPD based on highlights selected by the downloading user or client. The downloading user or client might also input a time interval or intervals as well, so that, for example, the downloading client could specify that content thirty seconds before and after the highlight also be included.

Since segments/representations are time-stamped, the server could build a combined MPD from multiple constituent MPDs. As an illustrative example, if people start randomly recording up to 10 minutes before the start time, the server could build an MPD corresponding to the combined media by truncating excess media from prior to the start time.

These teachings will also enable, for example, HTTP streaming clients to choose content intelligently in the multiple spectator use case. Examples of information that may be important for the downloading client in the multiple spectator use case include device type information (e.g. manufacturer, model), device camera information (e.g. lens aperture, image sensor size, number of megapixels, pixel size, shutter speed, ISO number, optical zoom, digital zoom, lens focal length, whether or not the sensor is back-illuminated, whether or not there is image stabilization, etc.), device audio capture information (number of microphones, whether they are directional or omnidirectional, linear range of the microphone, bandwidth of the microphone, etc.), and so forth. Some devices allow an external microphone to be plugged in and then the external microphone is used to capture the audio. Such information may be beneficial to enable the selection of preferred media to be downloaded by a downloading client. The selection may be made by the user, by the downloading client or by the server (or a proxy).

In the multiple spectator use case, the type of the device that recorded the media might be useful to the HTTP streaming client/user. Content recorded on a device known to have lower-quality hardware specifications (regarding, for example, camera quality or the like) might be less desirable to download for an HTTP streaming client/user consuming the media on a very high-end device with high quality hardware specifications. Device information and/or specifications of the recording device could be made available to the HTTP streaming client/user via a web page or could also be made available via the MPD.

In the MPD, this information might be contained in a Device Descriptor. For example, in one embodiment of a Device Descriptor, the "value" attribute contains text with the manufacturer and model name and/or number. In another embodiment, the Device Descriptor distinguishes between television cameras, microphones, and so forth at the event and cameras or microphones of a handheld device of a spectator. This can be defined by an XML syntax or an ABNF Syntax, for example.

As another example, a Camera Descriptor is defined to contain one or more of various camera specifications such as, for example, lens aperture, image sensor size, number of megapixels, pixel size, shutter speed, ISO number, optical zoom, digital zoom, lens focal length, whether or not the sensor is back-illuminated, whether or not there is image stabilization, and so forth). A Descriptor can be defined to contain a subset of characteristics. For example a "Camera Exposure Descriptor" can be defined with a "value" attribute that reflects the three parameters of exposure: ISO number, lens aperture, and shutter speed.

As one illustrative example in these regards, the Augmented Backus-Naur Form (ABNF) syntax for the "value" attribute of the "Camera Exposure Descriptor", in one embodiment, can comprise:

@value=DQUOTE ISO SP APERTURE SP SHUTTER_SPEED DQUOTE
ISO=2*4 DIGIT
APERTURE="f/" *DIGIT "."*DIGIT
SHUTTER_SPEED="1/"*DIGIT The above ABNF might correspond to value="100 f/2.8 ⅟₆₀," which would mean an ISO number of "100," an aperture of "f/2.8," and shutter speed of ⅟₆₀th of a second.

By one approach the downloading user selects a recording position to download based on a seating chart. When the user mouses over the seating chart or touches a location where the event has been recorded by a spectator, device information is displayed corresponding to the recorded device and the user selects media content based on this information.

By another approach the user is presented with a list of device types or device characteristics and can select preferred devices or device characteristics. This can be accomplished via a checklist, for example. If desired, content from multiple spectators is described within the same MPD, as described previously. In this case the downloading user can select different recording positions, orientations, or the like during the event timeline based on metadata as described above.

By yet another approach a downloading user can select content according to highlights of the event. For example, at a sports event, the highlights could correspond to key plays (for example, the type of which would typically appear on a local news broadcast in the sports section of a program). In one embodiment, the Period and Segment within the Period could be tagged with a "Highlight Descriptor" indicating the type of event or specific event if the camera that the content was recorded from captured an event of that type, or the specific event. This can be done by a server entity or on the recording device if it uploads presentation metadata. The MPD may contain Highlight Descriptors on several levels. For example, a Highlight Descriptor at the MPD level might contain an indication of all of the highlights present in the MPD, a Highlight Descriptor at the Period level may contain an indication of all the highlights in the Period, a Highlight Descriptor at the Adaptation Set level or Segment level may contain an indication of all of the highlights within the Adaptation Set or Segment, respectively, and so forth.

Generally a specific highlight list might only be available with some delay or for on-demand viewing as a complete highlight list would likely only be available after the event. That said, however, a generic highlight list, such as touchdowns in a football game, dunks in a basketball game, scores with less than a certain amount of time left, and so forth, could be described in advance. It is also possible that the highlight list is created on the fly and the Highlight Descriptors are added in real time or near real time by using device metadata (for example, position and orientation of the device) in order to determine whether or not the highlight was likely to have been in the device's field of view.

After the media is uploaded, the server (or another entity) may compile a list of specific events, mapping them to one or more uploaded media data segments/periods, and may create or modify highlight descriptors. By one approach the "value" attribute of the Highlight Descriptor is a URL. The URL corresponds to an enumerated list of highlights accessible via the URL and HTTP protocol. Accordingly, every highlight has a corresponding identifier or number and a human-readable description of the highlight. When the corresponding Period or Segment is tagged with the Highlight Descriptor, the "id" attribute of the Highlight Descriptor contains one or more of the identifier or number corresponding to the specific highlight. An example in these regards appears below in Table 4.

TABLE 4

| Highlight ID | Description |
| --- | --- |
| 0 | Seattle scores first touchdown of the game |
| 1 | San Francisco Player Jones makes a great defensive play at time X in the first quarter |
| 2 | San Francisco scores on 90 yard kickoff return at time Y in the $2^{nd}$ quarter |
| 3 | Seattle scores on $2^{nd}$ running touchdown just before the half |
| . | . |
| . | . |
| . | . |
| 15 | Seattle scores on a Hail Mary pass to win in triple overtime |

If the above Highlight List is accessible as a text file at, for example, http://www.example.com/highlights, and the above-described scheme of the Highlight Descriptor has a schemeIdUri, for example, of "urn:mpeg:dash:highlight_descriptor:2014", an example XML code corresponding to a Highlight Descriptor that would tag a media segment containing recorded media corresponding to Seattle's final Hail Mary could be as follows:

<HighlightDescriptor schemeIdUri="urn:mpeg:dash:highlight_descriptor:2014"
value="http://www.example.com/highlights"id="15"/>

A downloading media consumer can then use Highlight Descriptors to decide which content to download. A given downloading user may prefer, for example, the content recorded professionally by television cameras (as tagged by a Device Type Descriptor, for example), yet switches to content recorded by the handheld device of a spectator during the time when none of the television cameras capture a particular highlight or the handheld device of a spectator captures it at a better viewing angle. In some instances, this can be beneficial for replay at a sports event in order to get the best angle of an important play and determine, for example, if the referee made the correct call. By yet another approach a server entity creates a customized MPD based on highlights selected by the downloading user or client. The downloading user or client might also input a time interval or intervals so that, for example, the downloading client could specify that content thirty seconds before and after the highlights also be included.

Metadata that changes dynamically can also be used by HTTP Streaming clients. For example, the parameters of location and device orientation that were described above can change dynamically during the course of recording and can be recorded in a timed metadata track in the multimedia file. By one approach, a Position and/or Orientation Descriptor contains information corresponding to an average position and/or orientation over some time period, corresponding to a segment or a Period in the media presentation. By another approach, a Position and/or Orientation Descriptor also contains a link to a file containing a metadata track that informs the client/user how the Position and/or Orientation changes over time.

As one illustrative example in these regards, the file may contain a fast forward trick mode that a client uses to determine how the Position and/or Orientation parameters change with respect to an accelerated timeline. The descriptor, in another approach, contains a link that makes the information available in an alternative format. For example, if the position of the recorder is changing, a link can contain a map and an indication of how the spectator's position changes during the recording of the event. The map indicates a timeline or an accelerated timeline. The map might be a two dimensional map or a three dimensional map showing position and/or orientation parameters (or any parameters that can change dynamically). Any of the parameters that were described previously can be included in a Descriptor that enables the user to choose a spectator view more intelligently.

As noted above, some of these parameters could be static or dynamic. For example, location can be recorded as a static location in a box in the 3GPP File Format. This information can also be recorded dynamically in a timed metadata track. In one embodiment the HTTP Streaming client is able to determine from the metadata whether the location is static or dynamic. This information could be included in the Descriptor or separate descriptor schemes can be used for static and dynamic information. This same approach applies to any of the parameters described above. For example, if camera exposure parameters change during video recording, by one approach they are recorded in a metadata track. A sample of a "camera exposure" metadata track, for example, could contain values of ISO, aperture, and shutter speed.

These teachings enable, for example, the multiple spectator event use case where multiple spectators at an event record the content and upload their recorded content to a server that is or interfaces with an HTTP streaming server and HTTP Streaming clients and/or users are then able to use static or dynamic metadata to choose which view or content to download in a more specific and useful manner than has been previously possible.

The present disclosure may be embodied in other specific forms without departing from its essential characteristics. As but one example in these regards, these teachings will facilitate permitting a user to select only the video component of one item of media content and only the audio component of another item of media content to thereby obtain an aggregated video/audio stream that best suits the media consumer's preferences. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. An apparatus comprising:
a network interface;
a control circuit operably coupled to the network interface and configured to:
receive media content via the network interface from a plurality of different media sources provided by uploading devices associated with users, the media content corresponding to a shared experience and wherein the media content includes presented content regarding capture of the media content and includes user-recorded timed position and orientation metadata of a first device used by a user to record the media content, and wherein the media content at least includes video content and timed position and orientation metadata tracks;
use the user-recorded timed position and orientation metadata to calculate according to a first device position and orientation recorded in a timed metadata track of an uploading device at a time of an identified highlight whether or not the uploading user captured the highlight;
automatically truncate the media content that has been captured by the user prior to a start time of the time of the identified highlight according to the metadata;
provide a list of highlights to a second device;
receive a user selection of at least one highlight from the second device; and
based on the user selection, provide a customized media presentation description (MPD) for hypertext transfer protocol (HTTP) streaming to the second device, the MPD including an indicator representing whether the media content of the first device contains position and orientation metadata that are static or dynamic.

2. The apparatus of claim 1 wherein the provided MPD includes at least a plurality of levels with a first level listing all captured highlights and a second level listing all highlights in a given time period and further comprises at least one of:
technical information regarding the first device; and
parameter settings regarding the first device.

3. The apparatus of claim 1 wherein the shared experience comprises a temporally-shared experience.

4. The apparatus of claim 1 wherein the media sources of the plurality of different media sources are institutionally foreign to one another.

5. The apparatus of claim 1 wherein the control circuit is configured to include the list of highlights in the MPD in a form of highlights descriptors.

6. The apparatus of claim 5 wherein the control circuit is further configured to:

prepare the highlights descriptors, at least in part, by automatic use of the metadata.

7. The apparatus of claim 1 wherein the control circuit is further configured to:
stream media content to the second device based on the user selection.

8. The apparatus of claim 7 wherein the control circuit is configured to selectively simultaneously stream multiple items of the media content to the second device, wherein the multiple items of the media content all correspond to a same user selection.

9. A method comprising:
by a control circuit:
receiving media content via a network connection from a plurality of different media sources provided by uploading devices associated with users, the media content corresponding to a shared experience and wherein the media content includes presented content regarding capture of the media content and includes user-recorded timed position and orientation metadata of a first device used by a user to record the media content, and wherein the media content at least includes video content and timed position and orientation metadata tracks;
using the user-recorded timed position and orientation metadata to calculate according to a first device position and orientation recorded in a timed metadata track of an uploading device at a time of an identified highlight whether or not the uploading user captured the highlight;
automatically truncating the media content that has been captured by the user prior to a start time of a time of an identified highlight according to the metadata; and
providing a list of highlights to a second device;
receiving a user selection of at least one highlight from the device; and
based on the user selection, providing a customized media presentation description (MPD) for hypertext transfer protocol (HTTP) streaming to the second device, the MPD including an indicator representing whether the media content of the first device contains position and orientation metadata that are static or dynamic.

10. The method of claim 9 further comprising:
preparing highlight descriptors, at least in part, by automatic use of the metadata wherein the provided MPD includes the highlight descriptors at a plurality of levels with a highlight descriptor at a first level listing all captured highlights and a highlight descriptor at a second level listing all captured highlights in a given time period.

11. The method of claim 9 further comprising:
streaming media content to the second device based on the user selection.

12. The method of claim 9, wherein the provided MPD further comprises at least one of:
technical information regarding the first device; and
parameter settings regarding the first device.

13. The method of claim 9, wherein the shared experience comprises a temporally-shared experience.

14. The method of claim 9, wherein the media sources of the plurality of different media sources are institutionally foreign to one another.

15. The method of claim 9, further comprising streaming media content to the second device based on the user selection.

16. The method of claim 15 wherein streaming media content comprises selectively simultaneously streaming multiple items of the media content to the second device, wherein the multiple items of the media content all correspond to a same user selection.

17. A non-transitory memory having computer instructions stored therein which, when executed by a computer, cause the computer to:
receive media content via a network interface from a plurality of different media sources provided by uploading devices associated with users, the media content corresponding to a shared experience and wherein the media content includes presented content regarding capture of the media content and includes user-recorded timed position and orientation metadata of a first device used by a user to record the media content, and wherein the media content at least includes video content with timed metadata tracks;
using the user-recorded timed position and orientation metadata to calculate according to a first device position and orientation recorded in a timed metadata track of an uploading device at a time of an identified highlight whether or not the uploading user captured the highlight;
automatically truncating the media content that has been captured by the user prior to a start time of a time of an identified highlight according to the metadata; and
provide a list of highlights to a second device;
receive a user selection of at least one highlight from the device; and
based on the user selection, provide a customized media presentation description (MPD) for hypertext transfer protocol (HTTP) streaming to the second device, the MPD including an indicator representing whether the media content of the first device contains position and orientation metadata that are static or dynamic.

18. The non-transitory memory of claim 17, further comprising computer instructions that cause the computer to prepare highlight descriptors, at least in part, by automatic use of the metadata and the highlight descriptors include at least a plurality of levels with a first level listing of all captured highlights and a second level with all the highlights in a given time period.

19. The non-transitory memory of claim 17, wherein the provided MPD further comprises at least one of:
technical information regarding the first device; and
parameter settings regarding the first device.

20. The non-transitory memory of claim 17, wherein the shared experience comprises a temporally-shared experience.

21. The non-transitory memory of claim 17, wherein the media sources of the plurality of different media sources are institutionally foreign to one another.

22. The non-transitory memory of claim 17, further comprising streaming media content to the second device based on the user selection.

23. The non-transitory memory of claim 22 wherein streaming media content comprises selectively simultaneously streaming multiple items of the media content to the second device, wherein the multiple items of the media content all correspond to a same user selection.

* * * * *